US010630760B2

(12) United States Patent
Venkivolu et al.

(10) Patent No.: US 10,630,760 B2
(45) Date of Patent: Apr. 21, 2020

(54) ADAPTIVE ENCRYPTION IN CHECKPOINT RECOVERY OF FILE TRANSFERS

(71) Applicant: CA, Inc., Islandia, NY (US)

(72) Inventors: Dayakar Reddy Venkivolu, Telangana (IN); Machhindra Narayan Nale, Telangana (IN)

(73) Assignee: CA, Inc., Islandia, NY (US)

( * ) Notice: Subject to any disclaimer, the term of this patent is extended or adjusted under 35 U.S.C. 154(b) by 260 days.

(21) Appl. No.: 15/939,249

(22) Filed: Mar. 28, 2018

(65) Prior Publication Data

US 2019/0306221 A1    Oct. 3, 2019

(51) Int. Cl.
*H04L 29/06* (2006.01)
*H04L 29/08* (2006.01)
*G06F 11/14* (2006.01)
*H04L 9/06* (2006.01)

(52) U.S. Cl.
CPC .......... *H04L 67/06* (2013.01); *G06F 11/1402* (2013.01); *H04L 9/0618* (2013.01); *H04L 67/1002* (2013.01)

(58) Field of Classification Search
None
See application file for complete search history.

(56) References Cited

U.S. PATENT DOCUMENTS

| 5,010,573 A * | 4/1991 | Musyck | H04L 9/0637 380/28 |
| 6,275,588 B1 * | 8/2001 | Videcrantz | H03M 7/30 380/255 |
| 9,923,923 B1 * | 3/2018 | Sharifi Mehr | H04L 63/04 |
| 10,476,663 B1 * | 11/2019 | Lazier | H04L 9/0618 |

(Continued)

OTHER PUBLICATIONS

Kodialam, M. et al. Preconfiguring IP-over-Optical Networks to Handle Router Failures and Unpredictable Traffic. IEEE Journal on Selected Areas in Communications, vol. 25, Issue: 5. https://ieeexplore.ieee.org/stamp/stamp.jsp?tp=&arnumber=4211231 (Year: 2007).*

(Continued)

*Primary Examiner* — Jeremiah L Avery
(74) *Attorney, Agent, or Firm* — Morgan, Lewis & Bockius LLP

(57) ABSTRACT

Embodiments are provided herein for applying adaptive encryption in checkpoint recovery of a file transfer. An embodiment includes establishing a first connection between a first node and a second node, generating a first ciphertext object at the second node by encrypting first input data received from the first node based, at least in part, on an encryption algorithm and an input block, and storing the first ciphertext object in an output file. The embodiment further includes, subsequent to a communication failure via the first connection, establishing a second connection between the first node and the second node, obtaining a last block stored in the output file, and generating a second ciphertext object by encrypting second input data received from the first node based, at least in part, on the encryption algorithm and the last block. More specific embodiments include storing a current file offset based on detecting the communication failure.

20 Claims, 8 Drawing Sheets

(56) References Cited

U.S. PATENT DOCUMENTS

| | | | | |
|---|---|---|---|---|
| 2004/0091114 | A1* | 5/2004 | Carter | G06F 21/606 380/259 |
| 2005/0138428 | A1* | 6/2005 | McAllen | H04L 29/06 726/4 |
| 2007/0237332 | A1* | 10/2007 | Lyle | H04L 9/12 380/263 |
| 2009/0172413 | A1* | 7/2009 | LeQuere | G06F 21/72 713/189 |
| 2017/0034167 | A1* | 2/2017 | Figueira | H04L 63/0428 |
| 2017/0206382 | A1* | 7/2017 | Rodriguez De Castro | G06F 21/72 |

OTHER PUBLICATIONS

Saidi, Mohand Yazid et al. Improved Dual-Forest for Multicast Protection. 2006 2nd Conference on Next Generation Internet Design and Engineering. NGI' 06. https://ieeexplore.ieee.org/stamp/stamp.jsp?tp=&arnumber=1678265 (Year: 2006).*

"CA XCOM Data Transport," CA Technologies, Copyright 2014 (2 pages).

"File Transfer Protocol," Wikipedia, at least as early as Mar. 23, 2018, available online at https://en.wikipedia.org/wiki/Peer-to-peer_file_sharing, (10 pages).

"Peer-to-Peer File Sharing," Wikipedia, at least as early as Mar. 17, 2018, available online at https://en.wikipedia.org/wiki/File_Transfer_Protocol, (9 pages).

* cited by examiner

ADAPTIVE ENCRYPTION IN CHECKPOINT RECOVERY OF FILE TRANSFERS

TECHNICAL FIELD

The present disclosure relates in general to computer security, and more specifically, to adaptive encryption in checkpoint recovery of file transfers.

BACKGROUND

Peer-to-peer computing is a distributed application architecture involving two or more computing nodes in which each computing node has the same capabilities to facilitate a file transfer and any computing node can initiate a communication session with any other computing node. Peer-to-peer computing is often used to facilitate file transfers in which a computer file is transmitted through a communication channel from one node to another node by a negotiated file transfer protocol. A checkpoint restart capability in a file transfer application can help in recovering file transfer failures. Using a checkpoint restart capability, if a transfer is interrupted, it can be resumed from a checkpoint rather than starting over from the beginning of the file. An encryption at rest capability allows a stream of data being transferred during a file transfer operation to be encrypted while stored on a persistent store. If encryption at rest capability is enabled and a file transfer failure occurs, however, the transfer is not resumed from a checkpoint as the encryption object state cannot be restored after a checkpoint restart.

BRIEF SUMMARY

According to one aspect of the present disclosure, a first connection can be established between a first node and a second node. A first ciphertext object can be generated at the second node by encrypting first input data received from the first node based, at least in part, on an encryption algorithm and an input block. The first ciphertext can be stored in an output file. Subsequent to a communication failure via the first connection, a second connection is established between the first node and the second node, a last block store in the output file is obtained, and a second ciphertext object can be generated by encrypting second input data received from the first node based, at least in part, on the encryption algorithm and the last block.

BRIEF DESCRIPTION OF THE DRAWINGS

Like reference numbers and designations in the various drawings indicate like elements.

DETAILED DESCRIPTION

Figure 1:
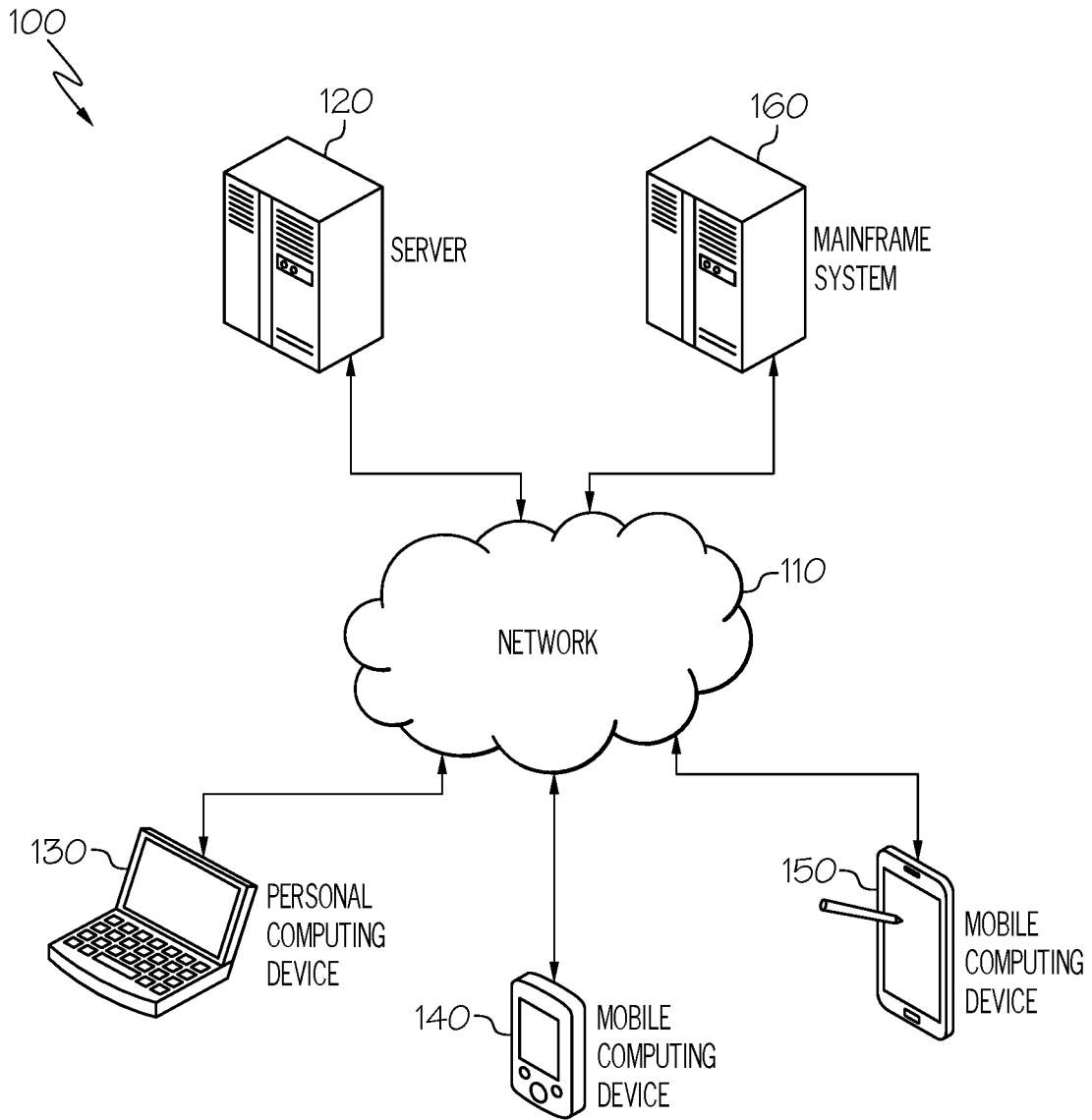
FIG. 1 is a simplified schematic diagram of an example computing environment for a system for applying adaptive encryption in checkpoint recovery in accordance with at least one embodiment.

As will be appreciated by one skilled in the art, aspects of the present disclosure may be illustrated and described herein in any number of patentable classes or contexts including any new and useful process, machine, manufacture, or composition of matter, or any new and useful improvement thereof. Accordingly, aspects of the present disclosure may be implemented entirely in hardware, entirely software (including firmware, resident software, micro-code, etc.) or combining software and hardware implementations that may all generally be referred to herein as a "circuit," "module," "component," "logic," "algorithm," "agent," or "system." Furthermore, aspects of the present disclosure may take the form of a computer program product embodied in one or more computer readable media having computer readable program code or instructions embodied thereon.

Any combination of one or more computer readable media may be utilized. The computer readable media may be a computer readable signal medium or a computer readable storage medium. A computer readable storage medium may be, for example, but is not limited to, an electronic, magnetic, optical, electromagnetic, or semiconductor system, apparatus, or device, or any suitable combination of the foregoing. More specific examples (a non-exhaustive list) of the computer readable storage medium include the following: a portable computer diskette, a hard disk, a random access memory (RAM), a read-only memory (ROM), a programmable read only memory (PROM), an erasable programmable read-only memory (EPROM or Flash memory), an electrically erasable programmable read-only memory (EEPROM), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, radio frequency (RF), etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, assembly language, or other programming languages. The program code may execute partly on one local or remote computer (e.g., server, server pool, mainframe, desktop, laptop, mobile device, appliance, etc.), and partly on another local or remote computer. A remote computer may be connected to a local computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS). Generally, any combination of one or more local computers and/or one or more remote computers may be utilized for executing the program code.

In one example, the program code is implemented on at least two computers connected via any suitable network or networks to enable peer-to-peer (P2P) communications between each pair of computers. P2P communication sessions enable computers to share resources (e.g., files, data) without going through a separate server or other computer. Generally, each computer or node has the same capabilities, which enable each node to function as both a client (e.g., receiving files, data) and a server (e.g., sending files, data). Typically, each node in a P2P network is capable of initiating a communication session with another node in the P2P network. Examples of P2P implementations include, but are not limited to, a local area network, an ad hoc arrangement between two (or more) computers connected by a Universal Serial Bus for example, a wide area network (e.g., the Internet) using special protocols and applications to facilitate direct relationships over the wide area network, or any suitable combination thereof.

Aspects of the present disclosure are described herein with reference to flowchart illustrations, interaction diagrams, and/or block diagrams of methods, apparatuses (systems) and computer program products according to embodiments of the disclosure. It will be understood that each block of the flowchart illustrations, each block of the block diagrams, and/or each interaction of the interaction diagrams, combinations of blocks in the flowchart illustrations, combinations of blocks in the block diagrams, and/or combinations of interactions in the interaction diagrams can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowcharts, the functions/acts specified in the block diagram blocks, and/or functions/acts specified in the interactions of the interaction diagrams.

These computer program instructions may also be stored in a computer readable medium that, when executed, can direct a computer, other programmable data processing apparatus, or other devices to function in a particular manner, such that the instructions when stored in the computer readable medium produce an article of manufacture including instructions that, when executed, cause a computer to implement the function/act specified in the flowcharts, the function/act specified in the block diagram block or blocks, and/or the function/act specified in the interactions of the interaction diagrams. The computer program instructions may also be loaded onto a computer, other programmable instruction execution apparatus, or other devices to cause a series of operations to be performed on the computer, other programmable apparatuses or other devices to produce a computer implemented process such that the instructions, which execute on the computer or other programmable apparatus, provide processes for implementing the functions/acts specified in the flowcharts, the functions/acts specified in the block diagram block or blocks, and/or functions/acts specified in the interactions of the interaction diagrams.

Referring now to FIG. 1, a simplified block diagram is shown illustrating an example computing environment 100 in which a system for applying adaptive encryption in checkpoint recovery enables the use of encryption at rest in conjunction with checkpoint recovery during a file transfer process. Example computing environment 100 includes example nodes (or peers) 120, 130, 140, 150, and 160 interconnected via a network 110. Each pair of nodes may be configured with program code, messaging protocols, and appropriate hardware to communicate with each other to facilitate a file transfer from one node to the other node and/or vice versa.

Examples of nodes in network 110 include, but are not limited to, personal computing devices (e.g., 130) such as laptops, desktops, and other personal computers, mobile computing devices such as smart phones (e.g., 140) and tablets (e.g., 150), servers (e.g., 120) such as application servers, database servers, web servers, media servers, etc., mainframe systems (e.g., 160), gaming devices, and any other device, component, or element operable to exchange information in network 110. One or more of the servers, network elements, personal computers, mobile devices, mainframe systems, and/or applications, programs, databases, resources, etc. running on the nodes may be virtualized according to embodiments disclosed herein. Additionally, the nodes may be capable of exchanging electronic information via one or more networks (e.g., 110).

With reference to various elements of FIG. 1, a description of the infrastructure of computing environment 100 is now provided. Elements of FIG. 1 may be coupled to one another through one or more interfaces employing any suitable connections (wired or wireless), which provide viable pathways for network communications. Additionally, any one or more of these elements of FIG. 1 may be combined or removed from the architecture based on particular configurations. For example, in some scenarios, a system that applies adaptive encryption in checkpoint recovery may be implemented in two nodes of a computing environment, such as computing environment 100. In other scenarios, the system may be implemented in more than two nodes, including for example, multiple nodes in networks spanning one or more countries around the world, such that file transfers may be accomplished from any one node to another node in the system. Furthermore, any two nodes in the system may be the same type of node or a different type of node.

Generally, a system for applying adaptive encryption in checkpoint recovery can be implemented in any type or topology of networks. Within the context of the disclosure, networks such as network 110 represent a series of points or nodes of interconnected communication paths for receiving and transmitting packets of information that propagate through computing environment 100. These networks offer communicative interfaces between sources, destinations, and intermediate nodes, and may include any local area network (LAN), virtual local area network (VLAN), wide area network (WAN) such as the Internet, wireless local area network (WLAN), metropolitan area network (MAN), Intranet, Extranet, virtual private network (VPN), and/or any other appropriate architecture or system that facilitates communications in a network environment or any suitable combination thereof. Additionally, radio signal communications over a cellular network may also be provided in computing environment 100. Suitable interfaces and infrastructure may be provided to enable communication with the cellular network.

Communications in computing environment 100 may be inclusive of messages, requests, responses, replies, queries, etc. Communications in a system that applies adaptive encryption in checkpoint recovery may be sent and received according to any suitable messaging protocols that facilitate file transfers, including protocols that allow for the transmission and/or reception of packets in a network. Suitable messaging protocols can include, for example, a multi-layered scheme such as Open Systems Interconnection (OSI) model, or any derivations or variants thereof. Examples of suitable protocols that enable file transfers include, but are not necessarily limited to, file transfer protocol (FTP) and secure file transfer protocol (SFTP) of transmission control protocol/IP (TCP/IP) and FTP over Secure Socket Layer (FTPs). Any suitable messaging protocols may be implemented in computing environment 100 where appropriate and based on particular needs.

In general, "servers," "clients," "computing devices," "network elements," "nodes," "peers," "systems," "mainframe systems," etc. (e.g., 120, 130, 140, 150, 160, etc.) in example computing environment 100, can include electronic computing devices operable to receive, transmit, process, store, or manage data and information associated with computing environment 100. As used in this document, the term "computer," "processor," "processor device," "processing element," or "processing device" is intended to encompass any suitable processing device. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Further, servers, clients, computing devices, network elements, nodes, peers, systems, mainframe systems, etc. (e.g., 120, 130, 140, 150, 160, etc.) can each include one or more processors, computer-readable memory, and one or more interfaces, among other features and hardware. Servers and/or mainframe systems can include any suitable software component or module, or computing device(s) capable of hosting and/or serving software applications and services, including distributed, enterprise, or cloud-based software applications, data, and services. For instance, in some implementations, server 120, mainframe system 160, or other sub-system of computing environment 100 can be at least partially (or wholly) cloud-implemented, web-based, or distributed to remotely host, serve, or otherwise manage data, software services and applications interfacing, coordinating with, dependent on, or used by other services and devices in computing environment 100. In some instances, server 120 and mainframe system 160 may be at least partially implemented locally in network 110. In some instances, a server, mainframe system, subsystem, computing device, etc. can be implemented as some combination of devices that can be hosted on a common computing system, server, server pool, or cloud computing environment and share computing resources, including shared memory, processors, and interfaces.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

For purposes of illustrating certain example techniques of a system for applying adaptive encryption in checkpoint recovery of file transfers, it is important to understand the activities that may be occurring in computing environment 100. The following foundational information may be viewed as a basis from which the present disclosure may be properly explained.

In cryptography, one possible mode of operation is an encryption algorithm that uses a block cipher and a symmetric key to encrypt messages of arbitrary length in a way that provides confidentiality or authenticity. Generally, a block cipher alone is suitable for the secure cryptographic transformation (encryption or decryption) of one fixed-length group of bits called a block. In a particular block cipher mode of operation, however, a block cipher's single block operation can be repeatedly applied to input data to securely transform amounts of data larger than a block. Thus, a block cipher can be used to secure a file that transferred in as a stream of data, such as records, from one node to another node.

Typically, a mode of operation requires a unique binary sequence for each encryption operation. This unique binary sequence (or unique block of bits) may be referred to herein as an 'initialization vector' or 'IV' or as an 'input block' or 'IB.' In at least one example, the IVs used in the repeated applications of a block cipher to particular input data are random and unique (i.e., the IVs are not duplicated for the encryption operations applied to different blocks of input data). The use of unique initialization vectors ensures that distinct ciphertext objects are produced from block cipher encryption even when the same plaintext is encrypted multiple times independently with the same key.

Although block ciphers can be associated with different block sizes, during encryption operations, block ciphers operate on fixed size blocks of bits. For example, a common block cipher, known as Advanced Encryption Standard (AES, AES128, AES192, AES256, etc.), can encrypt 128-bit blocks using a key of a predetermined length (e.g., 128, 192, or 256 bits). Another example of a block cipher, known as Data Encryption Standard (DES), can encrypt 64-bit blocks using a 64-bit key. A successor of DES is known as Triple DES (3DES) and applies the DES cipher algorithm three times to each data block.

A block cipher mode of operation that repeatedly applies the block cipher encryption to different blocks of bits from input data may require that the last part of the input data be padded to a full block size, if needed (i.e., if the last part of the input data is smaller than the current block size to which encryption is applied). Some examples of block cipher modes of operation that can be used in embodiments described herein include, but are not necessarily limited to, cipher feedback (CFB) mode, cipher block chaining (CBC) mode, and output feedback (OFB) mode. Each of these modes of operation can be used with the block ciphers previously mentioned such as AES (128, 192, or 256), 3DES, and DES.

Some block cipher modes can effectively use a block cipher as a stream cipher. Examples of block cipher modes of operation that can provide stream cipher properties include, but are not necessarily limited to, cipher feedback (CFB) mode, cipher block chaining (CBC) mode, and output feedback (OFB) mode. These block cipher modes may be capable of encrypting arbitrarily long sequences of bytes or bits. For example, CFB mode applies a block cipher to an initialization vector, having a particular block size, using a key to produce an output block of pseudo random bits. The output block is the same block size as the initialization vector. An XOR operation can be performed using bits of plaintext input data and a corresponding number of bits from the output block to produce an encrypted object. Thus, the plaintext input data may contain the same number of bits or fewer bits than the block size associated with the block cipher.

In peer-to-peer computing, a pair of computing nodes each host a data transfer application (also referred to herein as 'file transfer application'). These data transfer applications can be used to establish a connection between the nodes to enable a file transfer from one computing node (referred to herein as 'sending node') to the other computing node (referred to herein as the 'receiving node'). A checkpoint restart capability in a data transfer application helps in recovering transfer failures. When a checkpoint restart capability is enabled and a file transfer is interrupted, the file transfer can be resumed from a checkpoint indicating a certain location within the file rather than starting over from the beginning of the file.

An 'encryption at rest' capability allows the stream of a file transfer to be encrypted while being stored on a persistent storage device (e.g., non-volatile memory) associated with a receiving node. When an encryption at rest feature is enabled in peer-to-peer computing, input data is encrypted as it is received by a receiving node and is stored on a persistent storage device during a file transfer operation between nodes. If the file transfer is interrupted before the file transfer has completed, however, the transfer cannot be resumed from a checkpoint as the encryption object state cannot be restored after the checkpoint restart.

Generally, an encryption at rest feature cannot be used with a checkpoint recovery feature. A file transfer capability typically supports either checkpoint recovery or encryption at rest, but not both. This can lead to an undesirable choice between enabling only one of checkpoint recovery or encryption at rest. For example, in a file transfer scenario where only few bytes are left to be transferred and the data size of the file being transferred is large, if checkpoint recovery is not possible, the file transfer operation has to be restarted from the beginning of the file. On a mainframe system, for example, this can cause additional instructions per second (e.g., MIPS) and a resulting increased cost. Thus, scenarios in which large input files are transferred between nodes, may cause users to disable an encryption at rest feature in order to use the checkpoint recovery feature. Thus, either efficiency or security is compromised.

Figure 2:
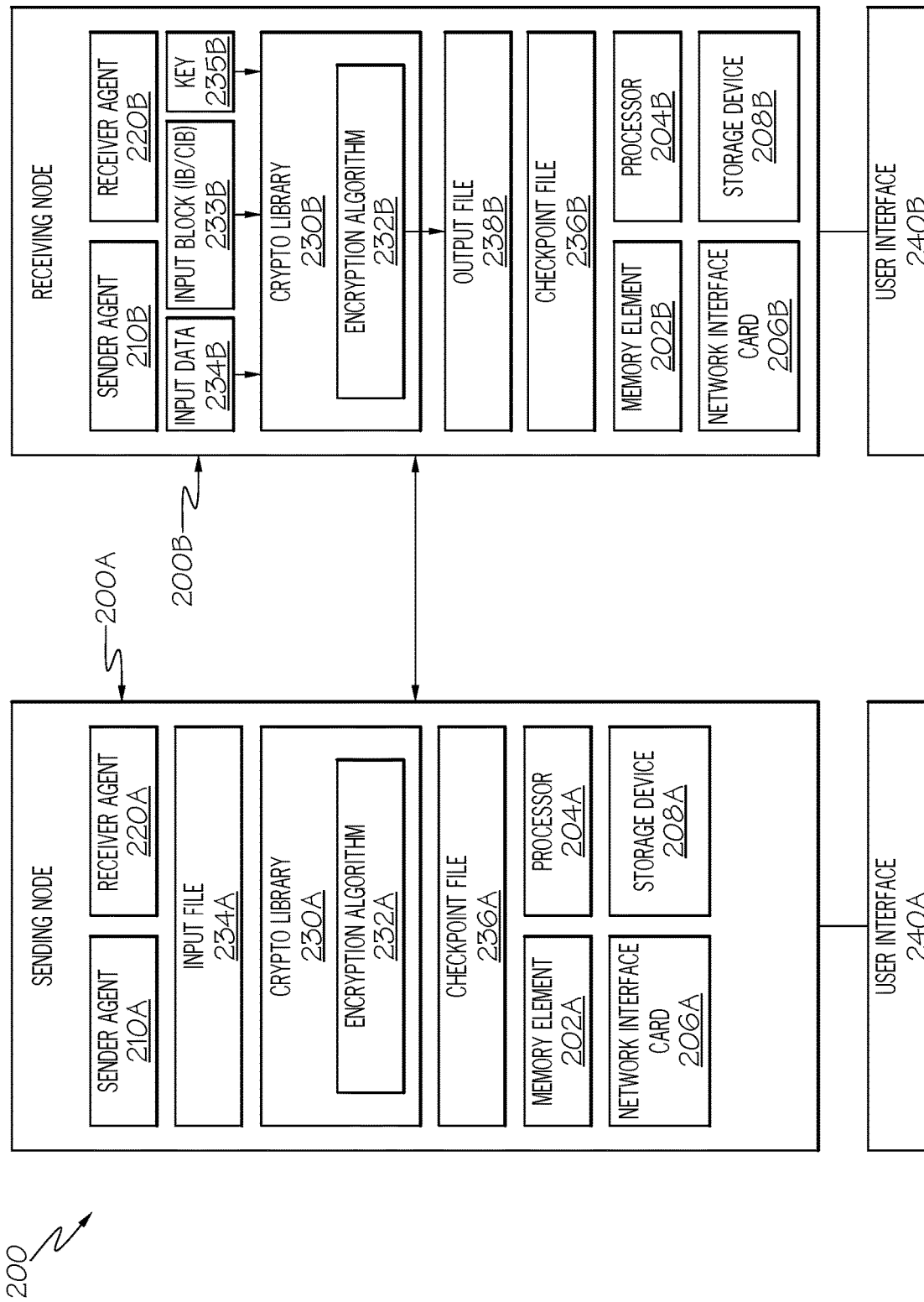
FIG. 2 is a simplified block diagram including additional possible details that may be associated with certain components of the system in accordance with at least one embodiment.

A system for applying adaptive encryption in checkpoint recovery, such as system 200 outlined in FIG. 2, can resolve these issues and others. The system recreates symmetric encryption/decryption object state to resume the encryption/decryption after a checkpoint recovery using cryptography cipher modes. Embodiments described herein exploit certain block cipher mode algorithms (e.g., CFB, CBC, OFB), when they are used to implement an encryption at rest capability during a file transfer process, to restore encryption state if the file transfer is interrupted.

In one embodiment, the cipher feedback (CFB) mode is exploited to restore encryption state if a file transfer is interrupted. In this embodiment, a connection is initially established between a sending node and a receiving node to transfer a file from the sending node to the receiving node. Several parameters may be selected at the receiving node. Such parameters may be user-selected or automatically selected based on default or pre-configured values. For example, a random input block (or initialization vector) can be selected, the encryption algorithm (ENC) may be set to a particular block size (B) that corresponds to the input block (IB) size, and an encryption key (KEY) can be selected. Plaintext input data is received at the receiving node from the sending node, encrypted based on the IB and the KEY, and stored in an output file. Input data continues to be received, encrypted, and stored until a checkpoint occurs. At the checkpoint, a start file position of the last block stored in the output file is determined and a ciphertext input block (CIB) is recalculated. The ciphertext input block begins at the start file position of the last block stored in the output file and is preserved so that it can be used as the ciphertext input block (CIB) in the future if a file transfer failure occurs and if, upon failure, no additional encrypted input data has been stored in the output file. If, upon failure, additional encrypted input data (e.g., ciphertext objects) has been stored in the output file since the last checkpoint, then the file transfer can be resumed from a negotiated file offset.

When a file transfer fails, based on the cipher mode being used, encryption object state can be recreated to resume the transfer from any arbitrary location. In order to restart after a file transfer failure (e.g., communication failure due to network connection failure, program fault, unresponsiveness, etc.), a correct file offset can be negotiated between the receiving node and the sending node. A ciphertext input block (CIB) is recalculated based on the negotiated file offset. To recalculate the CIB, the start file position of the last block stored in the output file is determined and the CIB is retrieved from the output file beginning at the start file position. This recalculated CIB can be used to recreate the encryption object state. Based on the negotiated file offset, plaintext input data can be sent to the receiving node from the sending node. The receiving node can receive and encrypt the plaintext input data using the recalculated CIB and the key to produce and store the next encrypted object in the output file. This can continue until the file transfer ends or until another checkpoint or transfer failure occurs.

In some scenarios of at least some embodiments, a ciphertext input block that was recalculated and preserved at a checkpoint may be used to recreate the encryption object state. For example, if a file transfer fails and if no additional input data was encrypted and stored in the output file after the last checkpoint (e.g., the transfer failure happened immediately after the checkpoint completes), then the preserved CIB from the last checkpoint may be used to recreate the encryption object state rather than recalculating a CIB. This may be determined based on a current checkpoint count. For example, a checkpoint count may be reset after a checkpoint and therefore, a checkpoint count that equals a reset value (e.g., zero) indicates no additional input data has been stored since the last checkpoint.

Embodiments of system 200 disclosed herein provide several advantages. Embodiments can enable secure file transfers in peer-to-peer communications without sacrificing efficiency provided by the use of a checkpoint recovery feature. Also, embodiments of system 200 allow very large file transfers (e.g., 100 Gigabyte) to be efficiently transmitted in a peer-to-peer connection without forgoing security for the file contents. While securely transmitting a file, the system helps avoid re-transmissions in the event of a communication failure. For example, if a file transfer fails near the end of a large file transfer, the transfer can be restarted based on a current file offset in the output file (or at a last checkpoint if no additional input data was stored after the last checkpoint) rather than restarting from the beginning of the file. This can be a significant advantage for example, if an entity needs to transmit sensitive data (e.g., financial institution, health care provider or insurer) that could potentially take many hours. Embodiments disclosed herein enable data to be transferred using an encryption at rest feature to preserve the confidentiality of the data, while simultaneously allowing the transfer to restart in the event of a transfer failure (e.g., after nine hours of a transfer that normally takes ten hours).

Turning to FIG. 2, FIG. 2 is a simplified block diagram illustrating possible details that may be associated with a system for applying adaptive encryption in checkpoint recovery during a file transfer of a peer-to-peer network connection. System 200 includes a sending node 200A and a receiving node 200B. Sending node 200A can include a sender agent 210A, a receiver agent 220A, a crypto library 230A with at least one encryption algorithm 232A, an input file 234A, and a checkpoint file 236A. Sending node 200A may also include any suitable hardware for use in implementing executable program code such as sender agent 210A, receiver agent 220A, and encryption algorithm 232A, and for storing data, such as input file 234A and checkpoint file 236A. Such hardware can include, but is not necessarily limited to, a memory element 202A, a processor 204A, a network interface card (NIC) 206A, which may be wireless in at least one embodiment, and a storage device 208A, which may be persistent storage that retains data when power is turned off. A user interface 240A (e.g., display with input device) may be provided with sending node 200A either as an integrated component or a separate component that is communicably coupled to sending node 200A.

Receiving node 200B can include a sender agent 210B, a receiver agent 220B, a crypto library 230B with at least one encryption algorithm 232B, an input block 233B, input data 234B, a key 235B, an output file 238B, and a checkpoint file 236B. Input data 234B may be received from sending node 200A during a file transfer process. Receiving node 200B may also include any suitable hardware for use in implementing executable program code such as sender agent 210B, receiver agent 220B and encryption algorithm 232B, and for storing data, such as output file 238B and checkpoint file 236B. Such hardware can include, but is not necessarily limited to, a memory element 202B, a processor 204B, a network interface card (NIC) 206B, which may be wireless in at least one embodiment, and a storage device 208B, which may be persistent storage that retains data when power is turned off. A user interface 240B (e.g., display with input device) may be provided with receiving node 200B either as an integrated component or a separate component that is communicably coupled to receiving node 200B.

Sending node 200A and receiving node 200B may each include a sender agent, a receiver agent, and a crypto library with an encryption algorithm because each of the nodes may operate as a sender or as a receiver with each other and possibly with other nodes in a peer-to-peer connection. Sending node 200A and receiving node 200B may be implemented on separate physical or virtual machines, such as servers, mainframe systems, computing devices (e.g., personal computing devices, mobile computing devices, etc.), or any other suitable electronic device or processing element. In addition, numerous types of nodes including, but not necessarily limited to, those described with reference to nodes 120, 130, 140, 150, and 160 of FIG. 1 may be configured in the same or similar manner as nodes 200A and 200B to achieve the intended functionality of a file transfer program that enables adaptive encryption in checkpoint recovery, and may also include any other appropriate components, modules, elements, hardware, software, firmware, program code, and data to achieve any other intended functionality based on particular configurations and/or provisioning needs.

In at least one example, sending node 200A and receiving node 200B include software to achieve (or to foster) the adaptive encryption in checkpoint recovery operations as outlined herein. Each of these elements can have an internal structure (e.g., a processor, a memory element, etc.) to facilitate some of the operations described herein. In other embodiments, these operations may be executed by hardware and/or firmware, executed externally to these elements, or included in some other node or computing system to achieve this intended functionality. Alternatively, nodes 200A and 200B may include this software (or reciprocating software) that can coordinate with other nodes or computing systems in order to achieve the operations as outlined herein. In still other embodiments, one or several devices may include any suitable algorithms, hardware, software, firmware, components, modules, agents, interfaces, or objects that facilitate the operations thereof. Components, modules, agents, etc. may be suitably combined or partitioned in any appropriated manner, which may be based on particular configuration and/or provisioning needs.

Sender agent 210A can be configured to establish a peer-to-peer connection with a receiving node (e.g., 200B) and to perform file transfer operations to effectively transfer a file, such as input file 234A, to the receiving node. Input file 234A can contain any suitable content to be shared with another node via a file transfer process. Examples of content include any type of data such as binary, numeric, voice, video, textual, multimedia, rich text file format, HTML, portable document format (pdf), digital media, or script, or any type of source or object code, or any other suitable information or data in any appropriate format that may be communicated from one node to another in electronic devices and/or networks.

In a peer-to-peer file transfer, data may be transferred in records, which can be defined based on file type. Examples of file types may include, but are not necessarily limited to, American Standard Code for Information Interchange (ASCII), binary, Extended Binary Coded Decimal Interchange Code (EBCDIC), Variable Length Records (VLR), and Extended Variable Length Records (EVLR). For ASCII files, a record length can be a single line in a file ending with Carriage Return Line Feed (CRLF) control characters or a Line Feed (LF) control character. For binary files, the record length can be configurable. In one example, a default record length for a binary file may be 1024 bytes. In EBCDIC files, the records have a fixed length.

In one example, input file 234A may contain records that are transmitted in a stream by sending node 200A to receiving node 200B. Additional file transfer operations performed by sending node 200A can include maintaining file transfer parameters such as a checkpoint count and a file offset. A checkpoint count can represent the amount of data (e.g., number of records) sent to the receiving node. In at least one embodiment, when the checkpoint count reaches a checkpoint threshold, a checkpoint request can be sent to the receiving node and, upon confirmation from the receiving node of the checkpoint request, the checkpoint count at the sending node can be reset to zero. A file offset is an integer indicating the distance (or displacement) between the beginning of the input file and a location in the input file corresponding to the beginning of the remaining data in the input file that has not yet been processed by the sender agent (e.g., data that has not yet been read and/or sent to the receiving node during the file transfer process). In at least one embodiment, the location can be expressed in bytes.

Checkpoint file 236A may be created and updated during a file transfer process. During the file transfer, file transfer parameters (e.g., checkpoint count, file offset, etc.) may be stored and updated in the checkpoint file 236A. Checkpoint file 236A may be stored in persistent storage device 208A in at least one embodiment. In some embodiments, checkpoint file 236A may be temporarily stored in other memory (e.g., memory element 202A, cache, etc.).

Receiver agent 220B can be configured to establish a peer-to-peer connection with a sending node (e.g., 200A) and to perform file transfer operations to receive input data 234B of an input file (e.g., 234A) from the sending node, and to cause the input data to be encrypted and then stored in persistent storage device 208B. Input data 234B may be encrypted by encryption algorithm 232B using key 235B and input block 233B. The encryption algorithm may produce ciphertext objects, which can be stored in output file 238B. In one or more embodiments, output file 238B may be stored in persistent storage device 208B (e.g., non-volatile memory). In at least one embodiment, input data 234B is received from the sending node in the form of records and, for each record that is encrypted, a single ciphertext object is produced. In other embodiments, for each record that is encrypted, two or more ciphertext objects are produced. In one example, each record comprises multiple blocks of input data and each block is encrypted into a ciphertext object.

Crypto library 230B may be configured to store at least some of the encryption parameters along with encryption algorithm 232B. For example, prior to receiving input data during a file transfer, crypto library 230B may be initialized with a block size and a key (e.g., 235B) associated with encryption algorithm 232B. These encryption parameters may be selected by a user, dynamically generated, or given default values. Input block 233B may also be selected by a user, dynamically generated, or given a default value. In certain implementations, however, input block 233B may be updated after each encryption is performed. For example, in a CFB mode of operation, input block 233B is updated with the ciphertext object produced from each encryption. Thus, after a first encryption is performed, the initial input block (IB) is updated with the ciphertext object produced from the first encryption, and the resulting ciphertext input block (CIB) is used for the next encryption performed on the next received input data. Thus, each encryption can produce a ciphertext object and an updated (or new) CIB based on the produced ciphertext object, where the updated (or new) CIB is to be used for the next encryption.

Additional file transfer operations performed by receiving node 200B can include maintaining file transfer parameters such as a checkpoint count and a file offset. A checkpoint count can represent the amount of data (e.g., number of records) received, encrypted, and stored by the receiving node. In at least one embodiment, when the checkpoint count reaches a checkpoint threshold, checkpoint parameters (e.g., file offset, recalculated ciphertext input block, etc.) can be stored in a persistent storage device and checkpoint count can be reset to zero. A file offset is an integer indicating the distance (or displacement) between the beginning of the output file and a location in the output file where the next data (e.g., the next ciphertext object produced from the encryption algorithm) is to be written. In at least one embodiment, the location may be expressed in bytes.

Checkpoint file 236B may be created and updated during a file transfer process. During the file transfer, file transfer parameters (e.g., checkpoint count, file offset, recalculated CIB from last checkpoint, etc.) may be stored and updated in checkpoint file 236B. Checkpoint file 236B may be stored in persistent storage device 208B in at least one embodiment. In some embodiments, checkpoint file 236B may be temporarily stored in other memory (e.g., memory element 202B, cache, etc.).

It should be apparent that, in a file transfer process in which receiving node 200B functions as the receiver of a file from a sending node, sender agent 210B in the receiving node may not be used. Similarly, in a file transfer process in which sending node 200A functions as the sender of a file to a receiving node, receiver agent 220A and encryption algorithm 232A in the sending node may not be used. In other embodiments, input file 234A may be encrypted and, during a file transfer operation, encryption algorithm 232A of the sending node may be used to decrypt the data in input file 234A before sending it to the receiving node.

Figure 3:
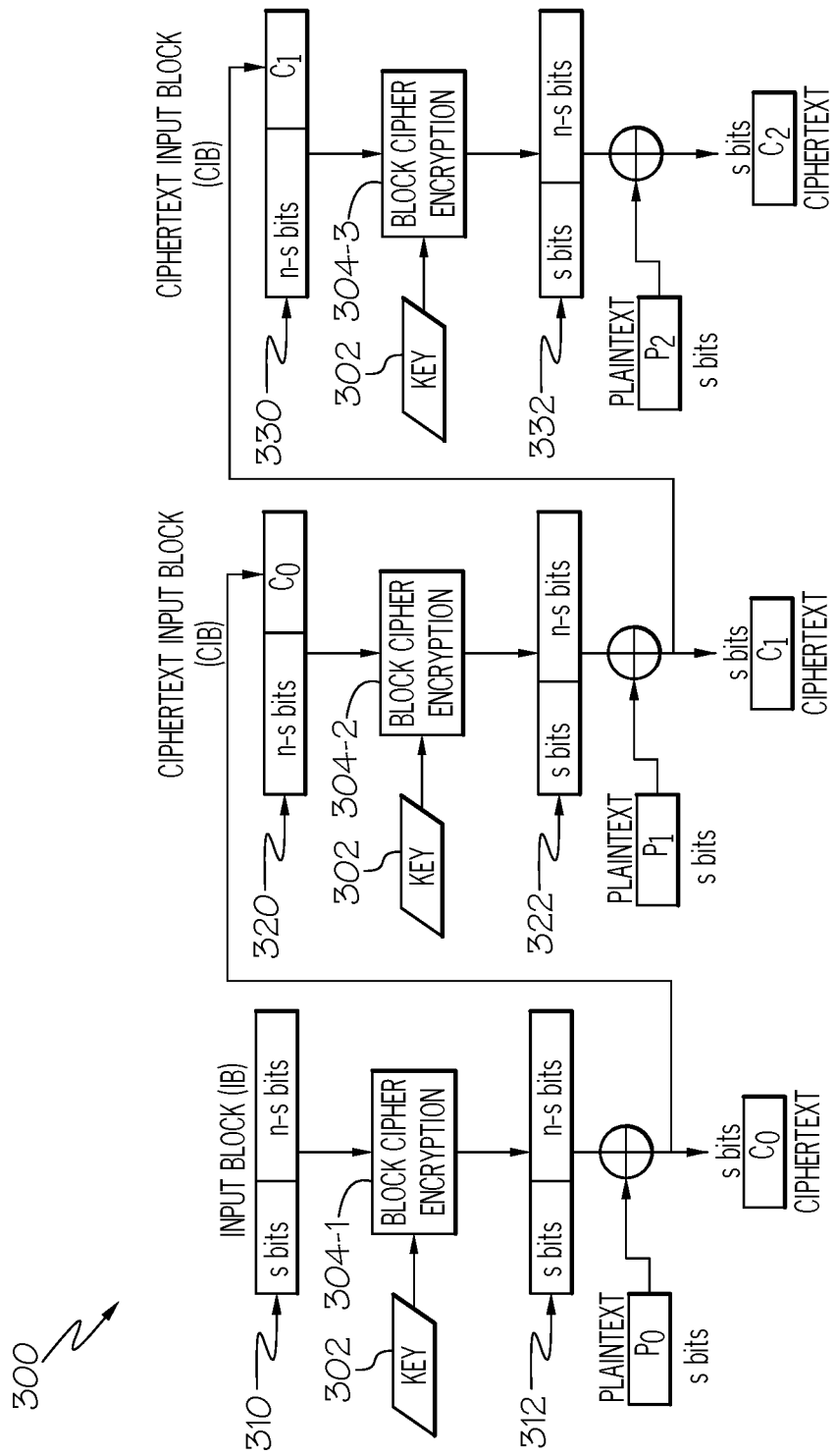
FIG. 3 is a block diagram illustrating one example technique of encryption that may be used in the system in accordance with at least one embodiment.

Turning to FIG. 3, FIG. 3 is a block diagram illustrating a cipher feedback (CFB) mode of operation 300. CFB is one example of a block cipher mode of operation that may be used in embodiments described herein. A CFB mode of operation can effectively operate as a stream cipher that applies block cipher encryption to each new segment of input data (e.g., each record) received by a receiving node from a sending node. CFB mode of operation 300 shows three successive block cipher encryptions 304-1, 304-2, and 304-3 performed as part of encrypting three successive segments of input data. In at least one embodiment, each block cipher encryption 304-1, 304-2, and 304-3 performs the same encryption with key 302, using different input blocks. Each output is applied to a different segment of input data to produce a unique ciphertext object.

In CFB mode of operation 300, a block size may be selected or preconfigured for the block cipher encryption. In this example, the block size is n bits and therefore, an input block (IB) 310 is n bits. Block cipher encryption 304-1 is used to encrypt input block 310 with key 302 to produce an output block 312 having the same block size (e.g., n bits). Output block 312 can be used to complete the encryption of input data, such as plaintext input data $P_0$. In at least one example, an exclusive OR (XOR) operation may be applied to the bits of plaintext input data $P_0$ and a corresponding number of bits from output block 312. For example, plaintext input data $P_0$ may contain s bits. Therefore, s bits may be selected from output block 312 to be used for the XOR operation. The remaining bits n-s of output block 312 may be discarded. The result of the XOR operation is a ciphertext object $C_0$ having s bits. In at least one embodiment, the ciphertext object can be flushed (e.g., stored) to an output file.

Ciphertext object $C_0$ can also be used as the ciphertext input block (CIB) 320 (or as a portion of the CIB) that is used for the block cipher encryption of the next plaintext input data $P_1$. In one example, CIB 320 can be generated by shifting the bits of IB 310 to the left and adding ciphertext object $C_0$ as the least significant bits of the block. Block cipher encryption 304-2 is used to encrypt ciphertext input block 320 with key 302 to produce an output block 322 having the same block size (e.g., n bits). Output block 322 can be used to complete the encryption of plaintext input data $P_1$. In this example, an exclusive OR (XOR) operation may be applied to the s bits of plaintext input data $P_1$ and the s bits selected from output block 322. The remaining bits n-s of output block 322 may be discarded. The result of the XOR operation is a ciphertext object $C_1$ having s bits. In at least one embodiment, the ciphertext object can be flushed (e.g., stored) to the output file.

Ciphertext object $C_1$ can also be used as the ciphertext input block (CIB) 330 (or as a portion of the CIB) that is used for block cipher encryption of the next plaintext input data $P_2$. In one example, CIB 330 can be generated by shifting the bits of CIB 320 to the left and adding ciphertext object $C_1$ as the least significant bits of the block. Block cipher encryption 304-3 is used to encrypt CIB 330 with key 302 to produce an output block 332 having the same block size (e.g., n bits). Output block 332 can be used to complete the encryption of plaintext input data $P_2$. In this example, an exclusive OR (XOR) operation may be applied to the s bits of plaintext input data $P_2$ and the s bits selected from output block 332. The remaining bits n-s of output block 332 may be discarded. The result of the XOR operation is a ciphertext object $C_2$ having s bits. In at least one embodiment, the ciphertext object can be flushed (e.g., stored) to the output file.

It should be noted that in some examples, the plaintext input data may be the same block size (e.g., n bits) associated with the block cipher encryption. In this scenario, the ciphertext object produced from the encryption could also be the same block size (e.g., n bits). Accordingly, each ciphertext object could fill the next CIB, rather than just a number of least significant bits of the next CIB.

Figure 4A:
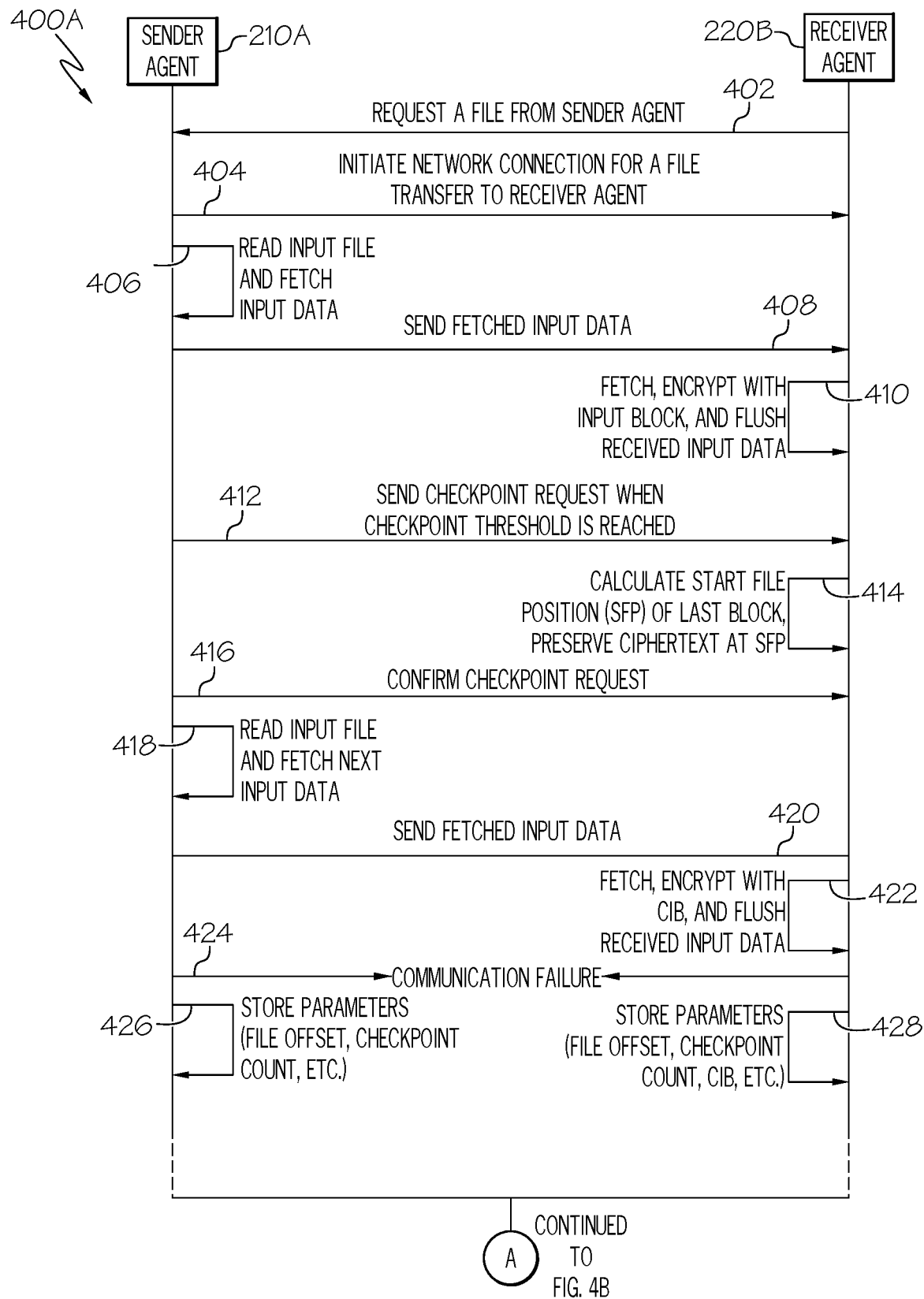
FIGS. 4A-4B show a simplified interaction diagram illustrating possible interactions between certain components of the system in accordance with at least one embodiment.
Figure 4B:
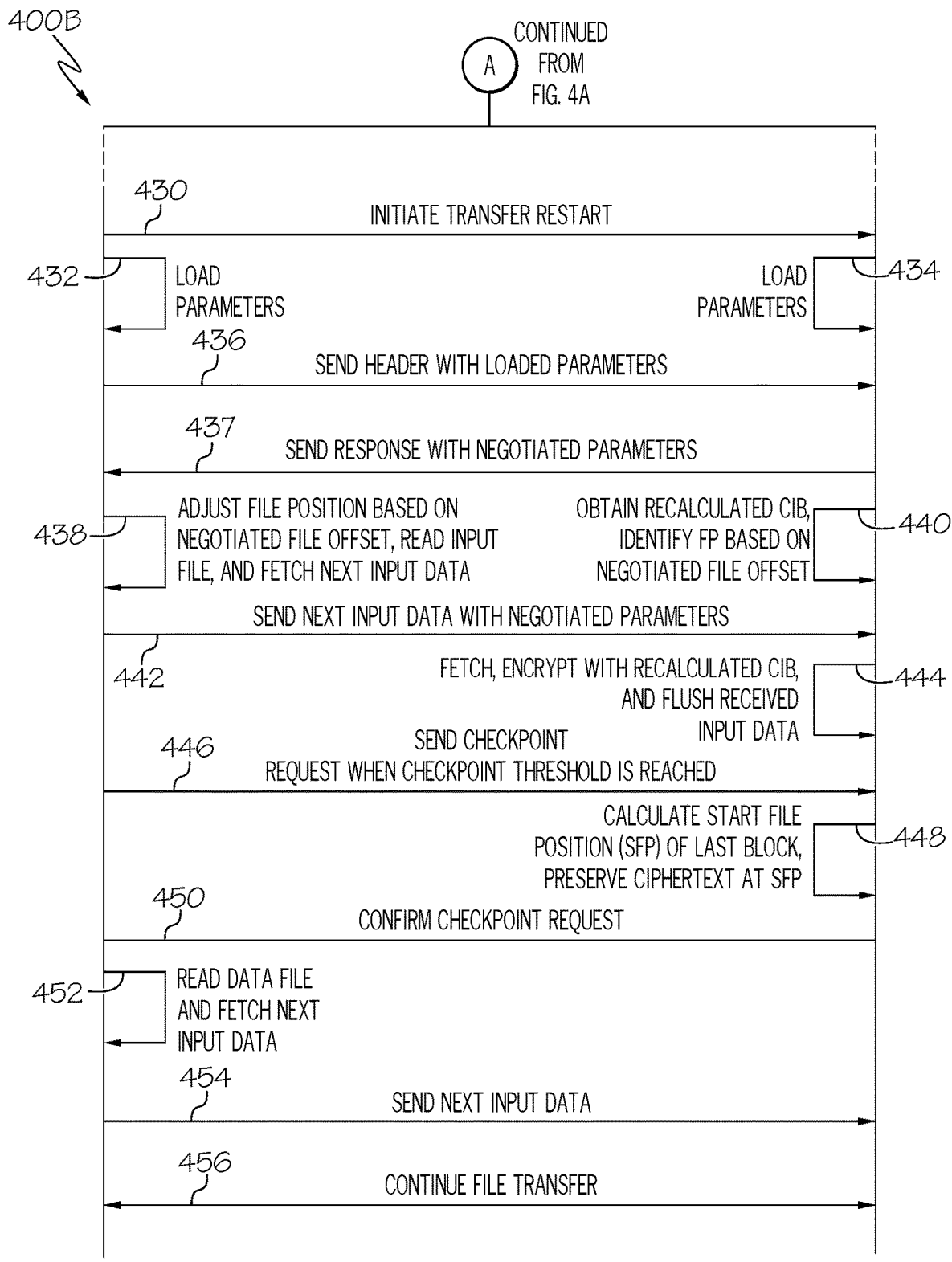

Turning to FIGS. 4A and 4B, a simplified interaction diagram, represented by flows 400A and 400B, respectively, illustrates potential communications between selected components of system 200. In particular, sender agent 210A of sending node 200A and receiver agent 220B of receiving node 200B are included in interaction diagram flows 400A-400B. For purposes of illustration, interaction diagram flows 400A-400B will be explained with reference to an example scenario in which these components may interact. Accordingly, for this illustration, it is assumed that sender agent 210A and receiver agent 220B establish a peer-to-peer connection over a suitable network (e.g., network 110) to enable a file transfer operation from sending node 200A to receiving node 200B.

Beginning at 402 in FIG. 4A, receiver agent 220B can request a file from sender agent 210A. At 404, sender agent 210A initiates a network connection for a file transfer to receiver agent 220B. At 406, sender agent 210A can read the requested input file (e.g., input file 234A) and fetch input data from the file. In at least one embodiment, each instance of fetching input data from the input file involves fetching a record of the input file and adjusting the file offset for the input file.

At 408, sender agent 210A can send the fetched input data to receiver agent 220B. Receiver agent 220B receives the input data from sender agent 210A. At 410, the receiver agent fetches the received input data (e.g., input data 234B), and encrypts the received input data using an encryption algorithm (e.g., encryption algorithm 232B), a key (e.g., key 235B), and an input block (IB) (e.g., input block 233B). The encryption algorithm can produce a ciphertext object, which can be flushed (e.g., stored, saved, etc.) into an output file (e.g., output file 238B) in persistent storage. In addition, file transfer parameters such as checkpoint count and file offset for the output file are updated.

In one example, the encryption algorithm may operate as described with reference to ciphertext feedback (CFB) mode of operation 300 of FIG. 3. For example, the encryption algorithm may include a block cipher that performs block cipher encryption of the IB with the key. The block cipher can produce an output block that is used to encrypt (e.g., via an XOR operation) the input data. The resulting encrypted input data is the ciphertext object that is flushed to the output file.

In at least one embodiment, the input block used for the first block cipher encryption in a file transfer can be a randomly generated (or user-selected) block of bits. After the first encryption, the IB can be updated by the resulting ciphertext object to produce a ciphertext input block (CIB). The CIB is used as input for the block cipher of the encryption algorithm to encrypt the next input data. Each subsequent ciphertext object produced by encryption can be used to generate the CIB input for the next block cipher encryption.

In one or more embodiments, each instance of received input data corresponds to a record from the input file at the sending node. In one or more embodiments, each record may be provided as plaintext input to the encryption algorithm and encrypted based on a single operation of a block cipher encryption, which uses an input block (IB/CIB) and a key. In at least some embodiments, the output of the block cipher encryption may be combined (e.g., XOR operation) with the input data to produce the encrypted input data or ciphertext object. Subsequent block cipher encryptions may result in additional records from the input file being encrypted. Furthermore, each segment of plaintext input data that is encrypted based on the block cipher may have a block size equal to or less than a block size associated with the encryption block cipher.

Interactions 406 through 410 may repeat and continue until a checkpoint request is received from the sending node, until a checkpoint threshold is reached at the receiving node, or until a communication failure occurs. In one example, the checkpoint count maintained by the sending node can represent an amount of data (e.g., a number records or other definable data segments) sent to the receiver agent from the sender agent. Once sender agent 210A determines that the checkpoint threshold has been met, then at 412, a checkpoint request is sent to receiver agent 220B from sender agent 210A.

A checkpoint request is a request or instruction from the sender agent for the receiver agent to perform a checkpoint operation during the file transfer to preserve the current state of the file transfer and the current state of encryption. A file transfer state can include a file offset for the output file and a checkpoint count calculated by the receiver agent. An encryption state can include the last ciphertext block stored in the output file by the receiving node. In some scenarios, the last ciphertext block can be recalculated and preserved (e.g., saved in storage) to be used as the ciphertext input block (CIB) for the next encryption performed after a communication failure during the file transfer process.

The file transfer state and encryption state preserved at a checkpoint can enable the file transfer to be restarted at the point of checkpoint if the file transfer experiences a communication failure, and if no additional data has been stored in the output file since the last checkpoint request (e.g., receiving node's checkpoint count=0). If a communication failure occurs subsequent to the checkpoint request and additional data has been stored in the output file since the last checkpoint request, then the file transfer can be restarted at a file offset negotiated between the sending node and receiving node. The negotiated file offset is typically the file offset of the output file at the time of the communication failure. If the file offset of the output file is lost in the communication failure, however, then it can be recalculated from the output file by using a file input/output application programming interface (API). If the output file is empty (i.e., no data has been stored), then the file transfer may be restarted from the beginning. A communication failure can include, but is not necessarily limited to, a network failure, a sending node crash due to a program fault, a receiving node crash due to a program fault, a receiving node becoming unresponsive, a sending node becoming unresponsive, an intervening network element crash, an intervening network element becoming unresponsive, or a power outage or loss.

At 414, upon receiving the checkpoint request from sending node 200A, a ciphertext input block is recalculated. In one example, receiver agent 220B calculates the start file position (SFP) of the last block that was successfully encrypted and stored in the output file, reads the block of data stored in the output file beginning at the SFP and corresponding to the block size associated with the block cipher, and preserves this data as the ciphertext input block for that checkpoint. One example calculation to identify the last block stored in the output file in a CFB mode of operation will be described in more detail with reference to FIG. 6.

At 416, receiver agent 220B sends a message back to sender agent 210A to confirm that the checkpoint request was received and appropriate action was taken. In particular, the action taken may include determining and saving the output file offset, a checkpoint count (e.g., based on the number of records received, encrypted, and stored at the receiving node), and the recalculated ciphertext input block (CIB) to potentially be used if a subsequent communication failure occurs before additional ciphertext objects are written to the output file.

After receiving the checkpoint confirmation at 416, at 418, sender agent 210A can read the input file and fetch the next input data, such as the next record, from the file. At 420, sender agent 210A can send the newly fetched input data to receiver agent 220B. At 422, the receiver agent fetches the received input data (e.g., input data 234B), and encrypts the received input data using the encryption algorithm (e.g., encryption algorithm 232B), the key (e.g., key 235B), and a new ciphertext input block (CIB) (e.g., 233B). In at least one embodiment, the CIB can be a ciphertext input block (CIB) that is at least partly generated based on the ciphertext object produced from the previous block cipher encryption in the file transfer. The encryption algorithm can produce another ciphertext object at 422, which can be flushed into the output file (e.g., output file 238B) at the output file offset.

Interactions 418 through 422 may repeat and continue until a checkpoint threshold is met, until an end of file is encountered in the input file being transferred, or until a communication failure is detected. For example, a communication failure may occur as indicated at 424. Upon the sending node detecting a communication failure, at 426, sender agent 210A may store, in a persistent store (e.g., checkpoint file 236A), required parameters including, but not necessarily limited to, a file offset of the input file being transferred and a checkpoint count that indicates how much data (e.g., the number of records) have been transmitted to receiving node 200B from sending node 200A since the last checkpoint.

Upon the receiving node detecting the communication failure, at 428, receiver agent 220B may store, in a persistent store (e.g., checkpoint file 236B), required parameters including, but not necessarily limited to, a file offset of the output file being created at the receiving node 200B, a checkpoint count that indicates how much data (e.g., the number of records) has been received, encrypted, and stored by receiver agent 220B since the last checkpoint, and a ciphertext input block (CIB) that was preserved at the last checkpoint request.

With reference to FIG. 4B, at 430, sender agent 210A can initiate a file transfer restart with receiver agent 220B. At 432, sender agent 210A can load from, the persistent storage (e.g., checkpoint file 236A), required parameters that were stored at 426, when the communication failure was detected by the sending node. These parameters can include, but are not necessarily limited to, the file offset of the input file being transferred and the checkpoint count that indicates how much data (e.g., the number of records) has been transmitted to receiving node 200B since the last checkpoint. Examples of other possible parameters that may be loaded by sender agent 210A include identification of the selected block cipher, input file name, input file path, record number, hash, etc.

At 434, receiver agent 220B can load, from persistent storage (e.g., checkpoint file 236B), required parameters that were stored when the communication failure was detected by the receiving node. These parameters can include, but are not necessarily limited to, the file offset of the output file being created at the receiving node, the checkpoint count that indicates how much data (e.g., the number of records) has been received, encrypted, and stored by the receiver agent since the last checkpoint, and the ciphertext input block (CIB) that was preserved at the last checkpoint request. It should be noted that, if a communication failure (e.g., 424) occurs prior to a checkpoint in the file transfer, then the checkpoint count will indicate how much data has been received, encrypted, and stored by the receiver agent since the file transfer began. Similarly, the checkpoint count at the sending node will indicate how much data has been sent to the receiving node by the sending node since the file transfer began.

At 436, sender agent 210A sends a message including a header with loaded parameters (e.g., file offset in input file, checkpoint count of input data sent to receiving node, etc.). At 437, the receiver agent sends a response to the sender agent with negotiated parameters. In particular, the negotiated parameters may include a current file offset of the output file and a checkpoint count that indicates the amount of input data (e.g., number of records) received, encrypted, and stored by the receiving node since the last checkpoint.

At 438, after receiving the negotiated parameters from the receiver agent, sender agent 210A adjusts, if needed, the file position on the input file being transferred based on the file offset received from the receiving node. Once the file position is adjusted, the input file can be read and the next data to be transferred can be fetched.

At 440, receiver agent 220B can identify the file position in the output file based on the negotiated file offset. Typically, the negotiated file offset is the current file offset of the output file (e.g., the file offset of the output file at the time of the communication failure). If the file offset of the output file is lost during the communication failure, however, then it may be recalculated from the output file by using an input/output API.

Also, at 440, a recalculated ciphertext input block (CIB) is obtained. If the checkpoint count indicates that no additional encrypted input data has been stored in the output file since the last checkpoint, then the CIB that was recalculated and preserved at the checkpoint can be obtained and used to encrypt the next received input data (i.e., the first input data received from the sender agent after the file transfer restarts). However, if the current checkpoint count indicates that additional encrypted input data has been stored in the output file since the last checkpoint, then a ciphertext input block can be recalculated based on the current output file offset. The recalculated CIB can be used to encrypt the next received input data (i.e., the first input data received from the sender agent after the file transfer restarts). For an implementation using a CFB mode of operation, an example of the recalculation of a CIB is described with reference to FIG. 6.

At 442, the input data fetched at 438 can be sent to receiver agent 220B, along with the negotiated parameters. At 444, the receiver agent fetches the received input data (e.g., input data 234B), and encrypts the received input data using the encryption algorithm (e.g., encryption algorithm 232B), the key (e.g., key 235B), and the recalculated CIB. The recalculated CIB may have been recalculated at the last checkpoint (e.g., 414) and preserved, or may have been recalculated at 440 based on a current file offset, as previously described with reference to 440. The encryption algorithm can produce a ciphertext object, which can be flushed into the output file (e.g., output file 238B).

Interactions at 438, 442 and 444 may repeat and continue until a checkpoint threshold is met by a checkpoint count on the sending node or the receiving node, until an end of file is encountered in the input file, or until a communication failure is detected. If a checkpoint threshold is met by a checkpoint count on sending node 200A, then at 446, a checkpoint request is sent to receiver agent 220B from sender agent 210A.

At 448, upon receiving the checkpoint request from sender agent 210A, receiver agent 220B calculates the start file position (SFP) of the last block that was successfully encrypted and stored in the output file, reads the block of data stored in the output file beginning at the SFP and corresponding to the block size associated with the block cipher, and preserves this data as the ciphertext input block (CIB) for that checkpoint. One example calculation to identify the last ciphertext block stored in the output file will be described in more detail with reference to FIG. 6.

At 450, receiver agent 220B sends a message back to sender agent 210A to confirm the checkpoint request was received and appropriate action was taken. In particular, the action taken may include determining and saving the output file offset, a checkpoint count (e.g., based on the number of records received, encrypted, and stored at the receiving node), and a recalculated ciphertext input block (CIB) to potentially be used in the next encryption if a subsequent communication failure occurs during the file transfer.

At 452, sender agent 210A reads the input file (e.g., input file 234A) and fetches the next input data from the input file. At 454, sender agent 210A can send the next input data to receiver agent 220B. Receiver agent 220B receives the next input data from sender agent 210A. At 456, the file transfer may continue, for example, at 444, until a checkpoint threshold is met, until an end of file is detected in the input file being transferred, or until a communication failure is detected. If a communication failure is detected, the flow may continue at 426.

Figure 5A:
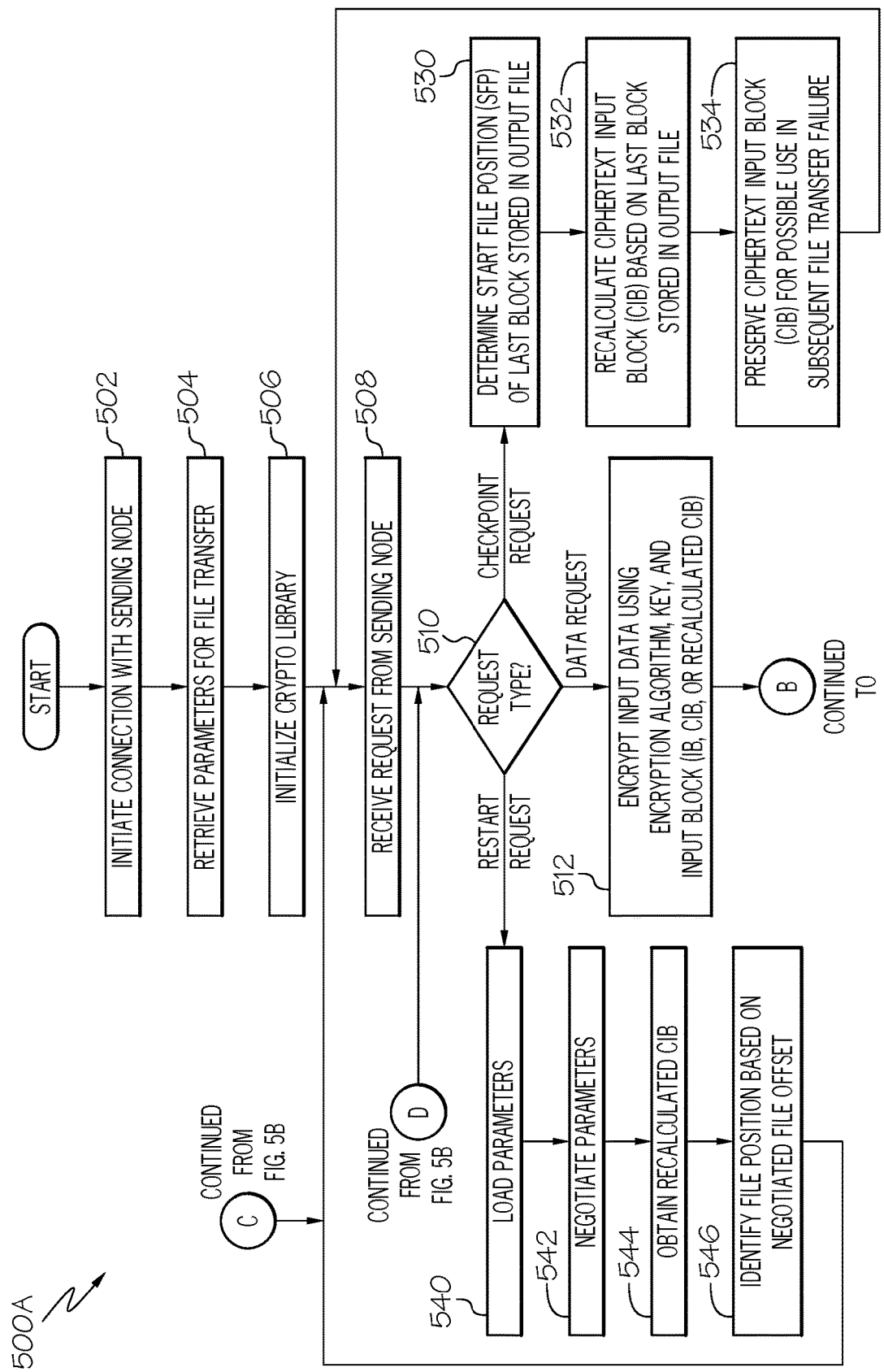
FIGS. 5A-5B show a simplified flowchart illustrating example techniques associated with the system in accordance with at least one embodiment.
Figure 5B:
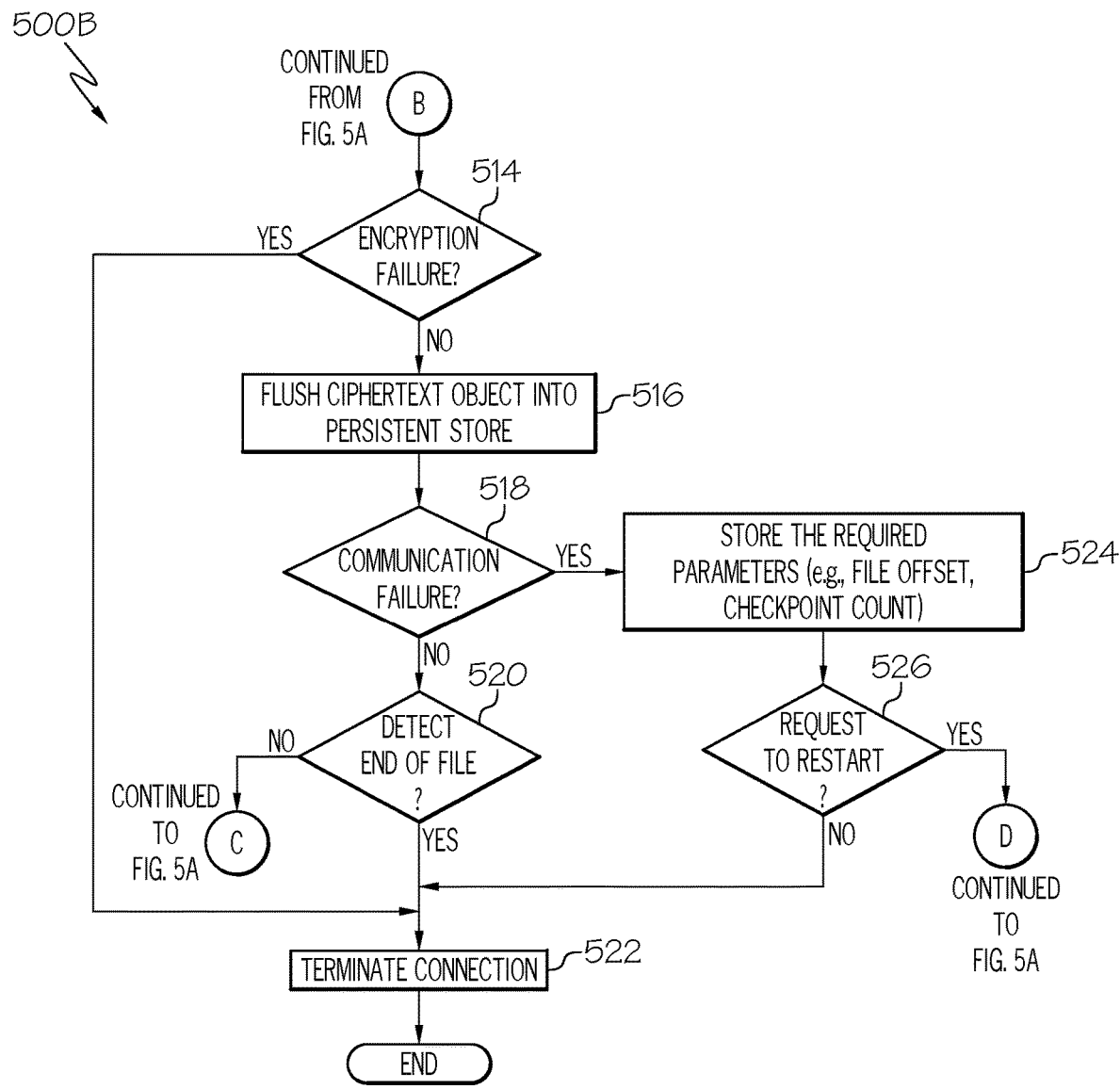

FIGS. 5A and 5B show a simplified flowchart, represented by 500A and 500B, illustrating example techniques associated with a system for applying adaptive encryption in checkpoint recovery. In at least one embodiment, one or more sets of operations correspond to activities of FIGS. 5A and 5B. A receiving node (e.g., 200B), or a portion thereof, may utilize the one or more sets of operations. The receiving node may comprise means, such as processor 204B, for performing the operations. In at least one embodiment, operations of the flow represented by 500A and 500B, or a portion thereof, may be performed by a receiver agent (e.g., 220B) and an encryption algorithm (e.g., 232B) on the receiving node (e.g., 200B) during a file transfer from a sending node (e.g., 200A) to the receiving node.

At 502, the receiving node initiates a network connection with the sending node. At 504, the receiving node can retrieve parameters needed for the file transfer. These parameters can include, but are not necessarily limited to, a file name, an encryption algorithm, a key, a block size, and a checkpoint threshold. At least some parameters may be received in a header of a message from the sending node. One or more parameters may be selected by a user in an embodiment. For example, one or more of the encryption algorithm, the input block, the key, the block size of the input block and key, and the checkpoint threshold may be user-selected. In other implementations, one or more of these parameters may be dynamically selected, preconfigured, or given default values. At 506, the crypto library of the receiving node can be initialized with the encryption algorithm, the key, the input block (IB) to be used in the first encryption, and/or the block size of the IB and key.

At 508, the receiving node receives a first request from the sending node. At 510, a determination is made as to the type of request received from the sending node. Types of requests can include a data request, a checkpoint request, or a restart request. A data request can contain the first input data of the file transfer for the receiving node. In this case, at 512, the received input data is encrypted using the encryption algorithm, the key, and the input block (IB) to be used for the first data encryption. The encryption algorithm can include a block cipher in at least one embodiment. If encryption is successful, a ciphertext object is generated by the encryption algorithm.

After encryption is performed, at 514 in FIG. 5B, a check is made as to whether the encryption failed. If the encryption failed, then the connection is terminated at 522 and the flow ends. If the encryption did not fail, then at 516, the ciphertext object is saved in an output file (e.g., output file 238B). In at least one embodiment, the output file 238B may be stored in a persistent storage device (e.g., persistent storage device 208B) of the receiving node.

At 518, a determination is made as to whether there has been a communication failure. A communication failure can include, but is not necessarily limited to, a network failure, a sending node crash due to a program fault, a receiving node crash due to a program fault, a receiving node becoming unresponsive, a sending node becoming unresponsive, or an intervening network element crash or unresponsiveness.

If no communication failure has been detected at 518, then at 520, a determination is made as to whether an end of file has been detected. If an end of file has been detected, then at 522, the connection is terminated and the flow ends. If an end of file is not detected, then flow returns to 508, where another request is received from the sending node. Receiving data requests at 508, encrypting received input data at 512, and flushing the resulting ciphertext object to an output file at 516 can continue until a network communication failure is detected, an encryption attempt fails, an end of file is detected, or a checkpoint request is received.

Data requests may be received until a checkpoint threshold is met. The receiving node and the sending node may keep track of separate checkpoint counts. At the sending node, the checkpoint count can represent the amount of input data (e.g., number of records) read from the input file and sent to the receiving node. At the receiving node, the checkpoint count can represent the amount of input data (e.g., number of records) received, encrypted, and stored by the receiving node since the last checkpoint was performed (or since the file transfer started if no checkpoints have been performed). The checkpoint threshold can represent the maximum number of records that can be processed (e.g., sent by the sending node, received by the receiving node) during a file transfer before a checkpoint is to be performed.

If the sending node determines that its checkpoint count reached the checkpoint threshold, then the sending node may send a checkpoint request to the receiving node. The checkpoint request is received by the receiving node at 508. At 510, a determination is made that the request received from the sending node is a checkpoint request. At 530, a start file position (SFP) of a last block stored in the output file is determined. At 532, a ciphertext input block (CIB) is recalculated based on the last block stored in the output file according to the block size associated with the encryption algorithm. The CIB may be recalculated by determining the start file position (SFP) of the last block and then, beginning at the start file position, reading an amount of data that is equivalent to the block size. One example of this calculation for a CFB mode of operation will be further described herein with reference to FIG. 6.

At 534, the recalculated CIB is preserved for future encryption operations if the file transfer operation fails and is restarted, but no additional encrypted input data has been stored in the output file. Preserving the recalculated CIB can be achieved by storing the recalculated CIB in a persistent storage device. In another implementation, preserving the recalculated CIB can be achieved by storing the determined start file position of the recalculated CIB in a persistent storage device. When the recalculated CIB has been preserved, flow passes back to 508 to receive the next request from the sending node.

With reference again to 518, if a communication failure has been detected, then at 524, the internal structure of the file transfer state is stored by the receiver agent in a persistent storage device (e.g., persistent storage device 208B). The internal structure can include parameters including, but not necessarily limited to, a current file offset of the output file being created at the receiving node, the checkpoint count that indicates how much data (e.g., the number of records) has been received, encrypted, and stored by the receiving node since the last checkpoint, and the preserved ciphertext input block (CIB) that was recalculated and preserved at the last checkpoint request.

At 526, if a request to restart the file transfer has not been received after a certain period, then at 522, the connection can be terminated. If a request to restart the file transfer has been received, however, then flow may pass back to 510 of FIG. 5A. At 510, a determination is made that the request received is a restart request.

At 540, the receiver agent 220B can load the required parameters that were stored when the communication failure was detected by the receiving node. These parameters can include, but are not necessarily limited to, the file offset of the output file being created at the receiving node, the checkpoint count that indicates how much data (e.g., the number of records) has been received, encrypted, and stored by the receiver agent since the last checkpoint (or since the beginning of the file transfer if no checkpoints have been requested), and the ciphertext input block (CIB).

At 542, the receiving node and sending node may negotiate certain parameters. For example, the output file offset maintained by the receiving node and the input file offset maintained by the sending node can be synchronized. Also, the checkpoint count maintained by the receiving node can be synchronized with the checkpoint count maintained by the sending node. Generally, the input file offset and the checkpoint count maintained by the sending node are adjusted to the values of the output file offset and the checkpoint count maintained by the receiving node, respectively. For example, if the sending node has a checkpoint count and file offset that is higher than the checkpoint count and file offset maintained by the receiving node, then the receiving node can send a message identifying the discrepancies so that the sending node can adjust its parameters accordingly. Thus, the sending node can re-read and/or re-send input data that was not received, encrypted, and stored by the receiving node, as indicated by the checkpoint count and the file offset maintained by the receiving node. If the file offset of the output file is lost during the communication failure, however, then it may be recalculated from the output file by using an input/output API. This recalculated file offset can be used to synchronize the file offset at the sending node.

At 544, a recalculated ciphertext input block (CIB) is obtained. If the checkpoint count indicates that no additional encrypted input data has been stored in the output file since the last checkpoint, then the CIB that was recalculated and preserved at the last checkpoint can be obtained and used to encrypt the next input data received from the sending node. However, if the checkpoint count indicates that additional encrypted input data has been stored in the output file since the last checkpoint, then a ciphertext input block can be recalculated based on the negotiated file offset. The recalculated CIB can be used to encrypt the next input data received from the sending node. For an implementation using a CFB mode of operation, an example of the recalculation of a CIB is described with reference to FIG. 6.

At 546, a file position in the output file is identified based on the negotiated (synchronized) file offset. This file position indicates where in the output file the next encryption object that is generated is to be stored. Flow can then pass to 508 to wait until the next request is received from the sending node. If the next request is a data request, as determined at 510, then at 512, the received input data is encrypted by the encryption algorithm, the key, and the recalculated ciphertext input block. Flow then continues as previously described herein at 514.

Figure 6:
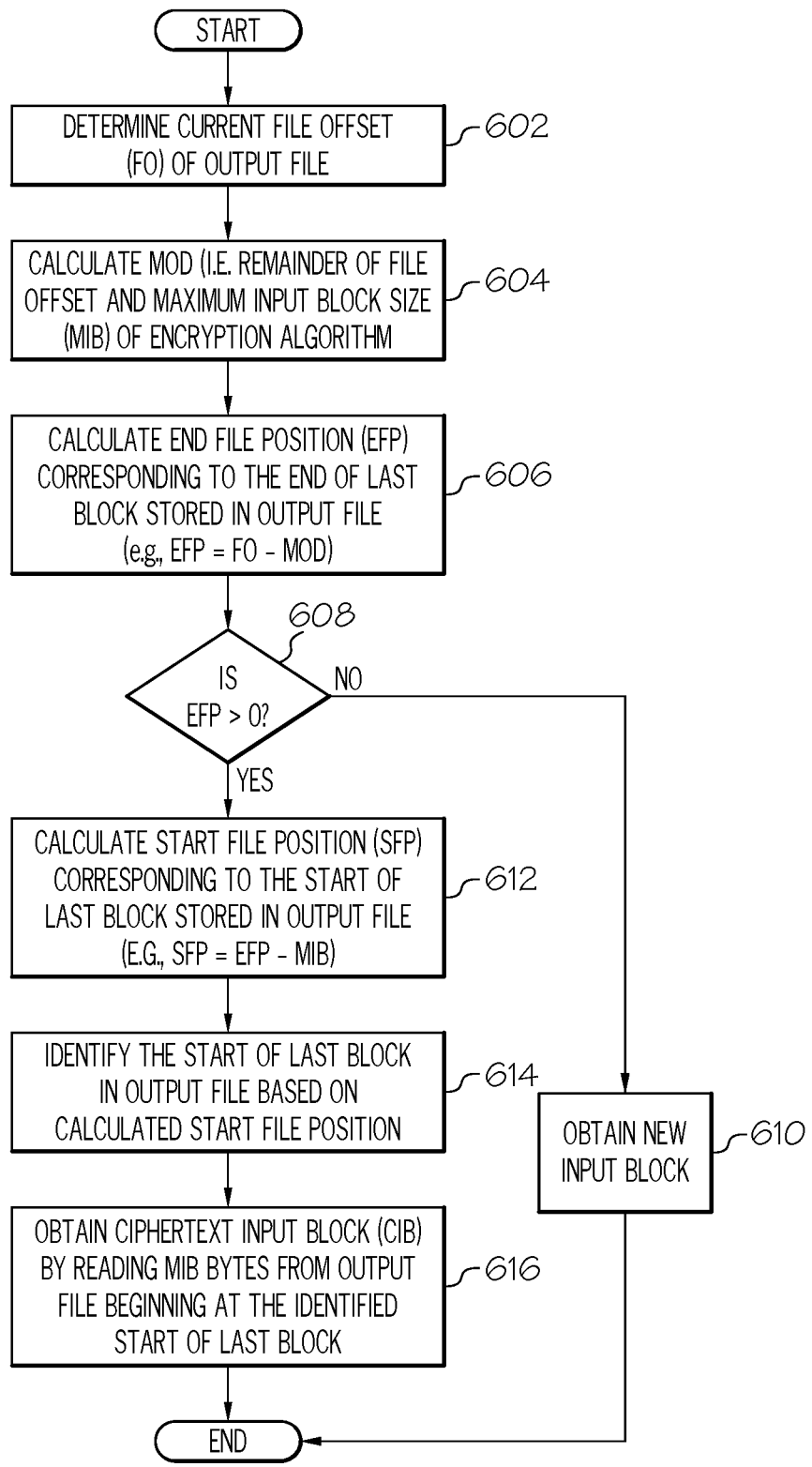
FIG. 6 is a simplified flowchart illustrating additional example techniques associated with the system in accordance with at least one embodiment.

Turning to FIG. 6, a simplified flowchart 600 is presented illustrating example techniques associated with a system for applying adaptive encryption in checkpoint recovery. In at least one embodiment, one or more sets of operations correspond to activities of FIG. 6. Each receiving node (e.g., 200B), or a portion thereof, may utilize the one or more sets of operations. Receiving node 200B may comprise means, such as processor 204B, for performing the operations. In at least one embodiment, operations of flow 600, or a portion thereof, may be performed by an encryption algorithm (e.g., 232B) on the receiving node (e.g., 200B) in response to receiving a checkpoint request from a sending node (e.g., 200A) or in response to restarting a failed file transfer. In each scenario, flow 600 recalculates a ciphertext input block (CIB), which is the last block stored in the output file based on the current (or negotiated) file offset of the output file.

At 602, a current file offset (FO) of an output file (e.g., 238B) is determined. The current file offset indicates the current position (e.g., byte) in the file where the next character is to be written. At 604, mod may be calculated based on the current file offset and a maximum input block size (MIB). The MIB corresponds to the block size associated with the encryption algorithm, which is the block size of input blocks (IB and CIBs) and possibly the key used by the encryption algorithm. The mod operation calculates the remainder of the file offset divided by the MIB.

At 606, an end file position (EFP) corresponding to the end of the last block stored in the output file may be calculated as follows: EFP=FO−MOD. At 608, a determination is made as to whether the EFP is greater than zero (or equal to zero). If the EFP is not greater than zero (e.g., EFP=0), then at 610 a new input block may be obtained. This scenario may occur in a file transfer failure that occurs very early in the file transfer. In this scenario, an entire block has not been successfully stored in the output file by receiving node 200B and, therefore, a random block of bits may be generated and preserved as the ciphertext input block to be used if the file transfer is restarted.

If the EFP is greater than zero, then at 612, a start file position (SFP) corresponding to the start of the last block stored in the output file is calculated. In one example, the following calculation may be performed: SFP=EFP−MIB. At 614, the start of the last block in the output file is identified based on the calculated SFP.

At 616, a recalculated ciphertext input block (CIB) is obtained by reading MIB bytes from the output file beginning at the identified start file position of the last block. When flow 600 is performed in response to a checkpoint request, the recalculated CIB can be preserved to be used as input to a block cipher of the encryption algorithm if a communication failure occurs and the file transfer is restarted before additional encryption objects are stored in the output file. When flow 600 is performed in response to a file restart request, the recalculated CIB can be used as input to the block cipher of the encryption algorithm in the first encryption that is performed after the file restarts.

The flowcharts and block diagrams in the FIGURES illustrate the architecture, functionality, and operation of possible implementations of systems, methods, apparatuses, and computer program products according to various aspects of the present disclosure. In this regard, each block or interaction in the flowchart illustrations, interaction diagram, or block diagrams may represent a module, segment, or portion of code, which comprises one or more executable instructions for implementing the specified logical function(s). It should also be noted that, in some alternative implementations, the functions noted in the block or interaction may occur out of the order noted in the figures. For example, two blocks or interactions shown in succession may, in fact, be executed substantially concurrently, or the blocks or interactions may sometimes be executed in the reverse order, depending upon the functionality involved. It will also be noted that each block or interaction of the block diagrams, interaction diagram, and/or flowchart illustrations, or combinations of blocks or interactions in the block diagrams, interaction diagram, and/or flowchart illustrations, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but does not preclude the presence or addition of one or more other features, integers, steps, operations, elements, components, and/or groups thereof.

As used herein, unless expressly stated to the contrary, use of the phrase 'at least one of' refers to any combination of the named elements, conditions, or activities. For example, 'at least one of X, Y, and Z' is intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6) at least one Y and at least one Z, but not X; or 7) at least one X, at least one Y, and at least one Z. Also, references in the specification to "one embodiment," "an embodiment," "some embodiments," etc., indicate that the embodiment(s) described may include a particular feature, structure, or characteristic, but every embodiment may or may not necessarily include that particular feature, structure, or characteristic. Moreover, such phrases are not necessarily referring to the same embodiment.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method comprising:
   establishing a first connection between a first node and a second node to start a file transfer from the first node to the second node;
   generating a first ciphertext object at the second node by encrypting first input data received from the first node based, at least in part, on an encryption algorithm and an input block;
   storing the first ciphertext object in an output file; and
   subsequent to a communication failure via the first connection:
      establishing a second connection between the first node and the second node;
      obtaining a last block stored in the output file; and
      generating a second ciphertext object by encrypting second input data received from the first node based, at least in part, on the encryption algorithm and the last block.

2. The method of claim 1, wherein the last block contains one or more ciphertext objects.

3. The method claim 1, further comprising:
storing the second ciphertext object in the output file after the last block.

4. The method of claim 1, further comprising:
subsequent to the communication failure, receiving a request from the first node to restart the file transfer.

5. The method of claim 1, wherein the encryption algorithm uses a block cipher, a key, and the input block to encrypt the first input data, and wherein the encryption algorithm uses the block cipher, the key, and the last block to encrypt the second input data.

6. The method of claim 1, further comprising:
storing a current file offset in a persistent data storage device based on detecting the communication failure.

7. The method of claim 1, further comprising:
calculating a start file position of the last block stored in the output file, the calculating based, at least in part, on a current file offset in the output file; and
using the calculated start file position to identify the last block.

8. The method of claim 7, further comprising:
using the current file offset to calculate an end file position of the last block stored in the output file; and
using the end file position and a block size associated with the encryption algorithm to calculate the start file position of the last block.

9. The method of claim 7, wherein obtaining the last block includes reading a number of bytes beginning at the calculated start file position in the output file, the number of bytes corresponding to a block size associated with the encryption algorithm.

10. The method of claim 1, wherein establishing the second connection includes sending, from the second node to the first node, a current file offset in the output file and a checkpoint count indicating a number of records stored in the output file.

11. The method of claim 10, wherein the second input data is obtained from an input file at the first node based on the current file offset.

12. The method of claim 10, further comprising, prior to the communication failure:
calculating the last block in response to receiving a checkpoint request prior to the communication failure; and
preserving the last block in a persistent storage device, wherein subsequent to the communication failure, the last block is obtained from the persistent storage device based on determining that the checkpoint count equals zero.

13. A non-transitory computer readable medium comprising program code that is executable by a computer system to perform operations comprising:
receiving first input data from a first node via a first connection established between the first node and a second node to transfer a file from the first node to the second node;
generating a first ciphertext object at the second node by encrypting the first input data based, at least in part, on an encryption algorithm and an input block;
storing the first ciphertext object in an output file;
obtaining a last block stored in the output file;
receiving second input data from the first node via a second connection established subsequent to a communication failure occurring over the first connection; and
generating a second ciphertext object at the second node by encrypting the second input data based, at least in part, on the encryption algorithm and the last block.

14. The non-transitory computer readable medium of claim 13, wherein the last block contains one or more ciphertext objects.

15. The non-transitory computer readable medium of claim 13, wherein the program code is executable by the computer system to perform further operations comprising:
calculating a start file position of the last block stored in the output file, the calculating based, at least in part, on a current file offset in the output file; and
using the calculated start file position to identify the last block.

16. The non-transitory computer readable medium of claim 15, wherein obtaining the last block includes reading a number of bytes beginning at the calculated start file position in the output file, the number of bytes corresponding to a block size associated with the encryption algorithm.

17. A system comprising:
a processor device;
a memory element coupled to the processor device; and
a receiver agent including instructions that are executable by the processor device to:
receive first input data of a file via a first network connection;
generate a first ciphertext object by encrypting the first input data using an encryption algorithm and an input block;
store the first ciphertext object in an output file;
obtain a last block stored in the output file;
receive second input data of the file via a second network connection established subsequent to a communication failure over the first network connection; and
generate a second ciphertext object by encrypting the second input data using the encryption algorithm and the last block.

18. The system of claim 17, wherein the last block includes one or more ciphertext objects.

19. The system of claim 17, wherein the instructions are executable by the processor device to further store the second ciphertext object in the output file after the last block in the output file.

20. The system of claim 17, further comprising:
a second processor device; and
a sender agent executable by the second processor device to:
subsequent to the communication failure, send a request to the receiver agent to establish the second network connection;
receive a file offset from the receiver agent;
obtain the second input data from the file based on the file offset; and
send the second input data to the receiver agent.

* * * * *